Sept. 27, 1927. R. A. MOORE ET AL Re. 16,745

BUCKLE

Original Filed Nov. 4, 1925

Inventors
Roswell A. Moore,
William F. Murtha
by Seymour & Earle
Attys

Reissued Sept. 27, 1927. Re. 16,745

UNITED STATES PATENT OFFICE.

ROSWELL A. MOORE AND WILLIAM F. MURTHA, OF WATERBURY, CONNECTICUT, ASSIGNORS TO WATERBURY BUCKLE CO., OF WATERBURY, CONNECTICUT, A CORPORATION.

BUCKLE.

Original No. 1,577,840, dated March 23, 1926, Serial No. 66,712, filed November 4, 1925. Application for reissue filed June 27, 1927. Serial No. 201,944.

The following drawings constitute part of this application, and represent in

Figure 1:
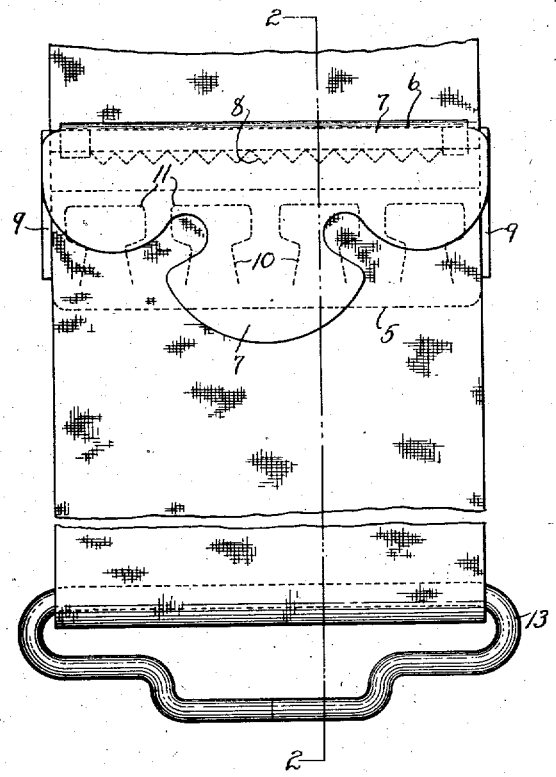

Fig. 1 a front view of a buckle constructed in accordance with our invention and shown as engaged with a piece of webbing.

Figure 2:
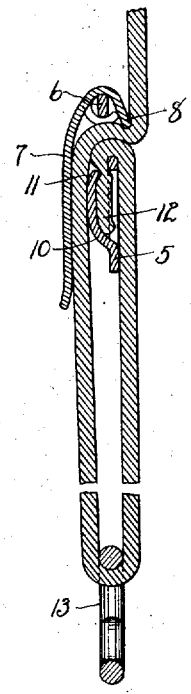

Fig. 2 a sectional view on the line 2—2 of Fig. 1.

Figure 3:
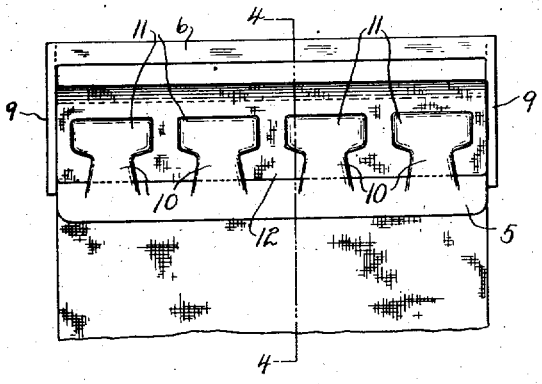

Fig. 3 a front view of the buckle-frame, with the lever removed.

Figure 4:
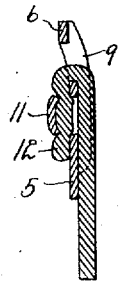

Fig. 4 a sectional view on the line 4—4 of Fig. 3.

This invention relates to improvement in buckles particularly adapted for use on suspenders and garters and of the so-called "rustless" type. In buckles of this type, the web has been attached to the frame by forming the frame with pointed prongs beneath which the web has been inserted and the prongs pressed against the web. The object of this invention is to form the buckle with grippers having heads which increase their holding capacity by increasing the area of contact between the grippers and the web, and the invention consists in the construction as hereinafter described and particularly recited in the claims.

In carrying out our invention, we form the buckle-frame from sheet-metal, comprising a plate 5 and a top-bar 6 upon which the lever 7 is pivoted in the usual manner, this lever having downwardly and rearwardly extending gripping-teeth 8. Preferably, the sides of the frame will be bent to form reinforcing flanges 9, and these flanges may extend forward or rearward. Struck out from the plate 5 are a series of grippers comprising necks 10, and these gripper-necks have heads 11 which are cupped, as shown in Fig. 4 of the drawings, so as to form a gripping-edge entirely around the head.

The end 12 of a strip of webbing is inserted between the grippers and the plate 5, as shown in Figs. 2 and 4 of the drawings, and the grippers are then pressed rearward against the webbing, and the edges of the heads bite into the webbing, so as to obtain a strong grip thereon, and the extent of this gripping surface is greater than the width of the webbing.

The sides of the heads being wider than the necks or lower portions of the grippers, the webbing is "bunched," so to speak, beneath the projecting heads and, consequently, forms a resistance against pulling out. The grippers might be likened to anchors, the sides of the heads forming flukes which hold the web, these flukes being embedded in the body of the web itself and, therefore, do not depend entirely upon their compression against the web.

After the webbing is connected with the buckle-frame, it is passed from front to rear, over the upper edge of the plate and beneath the top-bar, thence downward through a loop 13 and upward over the grippers and rearward through the opening below the top-bar, over which it is deflected by the teeth 8 of the lever 7.

With this construction, the end of the web is firmly attached to the buckle, without increasing the amount of webbing employed for this purpose, and the web is so firmly gripped as to withstand the strain which is placed upon it, whether the grippers project forward or rearward from the buckle-plate.

It is obvious, without further illustration, that the invention is applicable to slide-buckles, which are not provided with levers.

We claim:

1. A buckle having a frame comprising a plate and a top-bar, a lever pivotally connected with the top-bar, the plate formed with grippers each comprising a neck and a head struck out from it, the heads being wider than the necks.

2. A buckle having a frame comprising a plate and a top-bar, a lever pivotally connected with the top-bar, the plate formed with grippers each comprising a neck and a head struck out from it, the said heads being wider than the necks and cupped.

3. The combination with a buckle-frame, comprising a plate and a top-bar, a lever pivotally connected with the top-bar, grippers each comprising a neck and a head struck out from the plate, the heads being wider than the necks combined with a web inserted between the grippers and the plate, thence passing downward, and thence upward and beneath the top-bar in position to be engaged and deflected by the lever.

4. A buckle having a frame including a plate, the plate formed with grippers each comprising a neck and a head struck out from it, the heads being wider than the necks.

In testimony whereof, we have signed this specification.

ROSWELL A. MOORE.
WILLIAM F. MURTHA.